United States Patent
Naito et al.

(10) Patent No.: US 7,843,933 B2
(45) Date of Patent: Nov. 30, 2010

(54) NON-STOP SWITCHING EQUIPMENT FOR PACKET BASED COMMUNICATION LINKS

(75) Inventors: Sei Naito, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 166 days.

(21) Appl. No.: 12/134,769

(22) Filed: Jun. 6, 2008

(65) Prior Publication Data

US 2008/0304488 A1 Dec. 11, 2008

(30) Foreign Application Priority Data

Jun. 8, 2007 (JP) .............................. 2007-152667

(51) Int. Cl.
*H04L 12/28* (2006.01)
*H04J 3/24* (2006.01)
*H04J 3/06* (2006.01)

(52) U.S. Cl. .................... 370/395.1; 370/473; 370/512; 370/516

(58) Field of Classification Search ........................ None
See application file for complete search history.

(56) References Cited

U.S. PATENT DOCUMENTS 5,475,675 A * 12/1995 Kondo et al. ................ 370/219

2003/0118042 A1* 6/2003 Nishida et al. .............. 370/404
2007/0081562 A1* 4/2007 Ma ............................ 370/516

FOREIGN PATENT DOCUMENTS

| JP | 10-303966 A | 11/1998 |
| JP | 2001-237810 A | 8/2001 |
| JP | 2003-273902 A | 9/2003 |

OTHER PUBLICATIONS

Ohta, Hiroshi et al.; "Hitless Line Protection Switching Method for ATM Networks"; Technical Report of IEICE, vol. 92, No. 287, CS92-48, Oct. 1992.

* cited by examiner

*Primary Examiner*—Gregory B Sefcheck
*Assistant Examiner*—Nima Mahmoudzadeh
(74) *Attorney, Agent, or Firm*—Westerman, Hattori, Daniels & Adrian, LLP

(57) ABSTRACT

When packets reach from the 0 system and the 1 system, the packet selecting means 21 determines, based on the sequence numbers held in the packet output record register 22, whether or not the corresponding packet has passed, interrupts passing of the corresponding packet to the output side if passed, and allows the corresponding packet to pass to the output side if not passed. When the packet selecting means 21 selects a packet and allows the packet to pass to the output side, the packet output record register 22 holds the sequence number of the corresponding packet as a packet output record. Phase adjusting means that absorbs an average difference in delay for transmission between the systems may be provided at a stage before the packet selecting means 21.

8 Claims, 2 Drawing Sheets

US 7,843,933 B2

NON-STOP SWITCHING EQUIPMENT FOR PACKET BASED COMMUNICATION LINKS

BACKGROUND OF THE INVENTION

1. Field of the Invention

The present invention relates to non-stop switching equipment for packet-based communication links, and in particular to the non-stop switching equipment for packet-based communication links in a transmission system for transmitting image data packet by packet using a plurality of systems of a redundant configuration, which is able to transmit packets to the output side by a non-stop switching at a packet level while selecting packets of an authentic system from received packets.

2. Description of the Related Art

In a transmission system that increases the reliability of data communications using a dualized redundant configuration, the same data is transmitted in two systems, and the receiving side selects and receives either one of the data reached from the respective systems. According to such a configuration, even when one system is in failure or is under maintenance, the system can receive data, thereby the reliability of data communications can be increased.

Patent Document 1 describes a non-stop transmission path switching system and a receiving apparatus, which accord phases of data at the receiving side of a redundant configuration comprising on the 0 system and the 1 system. Herein, the phase according of data between the systems is carried out, based on frame number given to data frame that is a transmission unit.

Patent Document 2 describes a packet communications apparatus, a packet communications network, and a line switching method therefore, which are provided with a non-stop line function in which errors and loss of user information do not occur even if a line disturbance occurs in an asynchronization communications network such as, for example, ATM and IP. The transmission packet communications apparatus includes a structure by which marked packets are inserted into a packet sequence at a predetermined cycle. The marked packet includes error check information for groups of data packets located between the corresponding marked packet and a marked packet inserted immediately before, and identification information showing that the corresponding packet is a marked packet. The receiving packet apparatus carries out phase administration and error detection of the corresponding data packets based on the contents of the received marked packet, and selects a system which finally outputted group by group of packets corresponding the marked packet according to the error detection.

Patent Document 3 relates to a fault detection system in a redundant configuration system of an Internet work apparatus, and describes that, in order to switch from the port of a currently used router to a replacement port when the port has a fault occurrence and to improve the reliability of operation after switching, an OAM (operation administration and maintenance) frame is periodically inserted at the transmission side, and the line quality for the respective systems is measured at the receiving side.

Non-Patent Document 1 shows a method for executing phase focusing between systems by a delay insertion, aiming at anon-stop switching at the unit of ATM cell.

[Patent Document 1] Japanese Published Unexamined Patent Application No. 2001-237810

[Patent Document 2] Japanese Published Unexamined Patent Application No. 2003-273902

[Patent Document 3] Japanese Published Unexamined Patent Application No. H10-303966

[Non-Patent Document 1] Technical Report of the Institute of Electronics, Information and Communication Engineers-(IEICE), October 1992, Vol. 92, No. 287, CS92-48

The arts described in Patent Document 1 and Non-Patent Document 1 are based on the assumption that fault information of respective systems which is the current/reserve selection reference is given from the network facility side such as a switchboard, wherein the receiving side apparatus is not provided with a mechanism of fault detection.

As in the arts described in Patent Document 1 and Non-Patent Document 1, in such a configuration that a fault system is detected at the network facility side, and the system is switched to an authentic system at the receiving side apparatus based on the detection, it takes a predetermined duration of time until the systems are switched after the fault is detected, wherein the transmission system is brought into a failure state in the duration of time. In a real-time based data transmission system such as distribution of live images, it is desirable that the system is prevented from being temporarily brought into a failure state. Therefore, in view of securing the reliability using a redundant configuration, it is desired that selection of an authentic system and a system switching are carried out at the same point at the receiving side.

Since, in the arts described in Patent Documents 2 and 3, it is necessary to additionally generate packets for quality measurement periodically at the transmission side in order to detect errors in the respective systems, there are problems (1) through (3) as shown below.

(1) Large-scaled function enhancement is required at the transmission side apparatus when carrying out a system configuration corresponding to non-stop switching.

(2) Since it becomes necessary to transmit packets for quality measurement other than data packets in a transmission line, the transmission efficiency is lowered. In addition, since no consideration is given to losses of the packets for quality measurement where the transmission line is interrupted, sufficient reliability is not secured in measurement of the quality of each of the systems.

(3) Since a processing delay occurs depending on an insertion cycle of packets for quality measurement and quality measurement time at the receiving side, these arts are not suitable for a data transmission system that requires low delay.

SUMMARY OF THE INVENTION

It is therefore an object of the present invention to provide non-stop switching equipment for packet-based communication links, which can solve the above-described problems and is used in a transmission system for transmitting image data packet by packet using a plurality of systems of a redundant configuration, and which can output packets to the output side by non-stop switching at a packet level while selecting an authentic system from received packets without utilization of any special packets.

In order to accomplish the object, the first feature of this invention is that a non-stop switching equipment for packet-based communication links in a transmission system for transmitting image data packet by packet using a plurality of systems of a redundant configuration, comprises means for selecting packets, which selects packets from a plurality of systems and allows the same to pass to the output side, and means for storing output record information of packets, which holds the record information of packets passed by the packet selecting means, wherein the packet output record information storing means holds the sequence numbers of the packets as the record information whenever the packet selecting means selects packets and allows the same to pass to the output side, and the packet selecting means determines, when a packet reaches from respective systems, whether or not the corresponding packet has passed, based on the sequence numbers held in the packet output record information store means, interrupts passing of the corresponding packet to the output side if passed, and allows the corresponding packet to pass to the output side if not passed, and, thereby, the packet selecting means selects packets reached from the respective systems packet by packet and allows the same to pass to the output side.

The second feature of this invention is that the non-stop switching equipment for packet-based communication links further comprises means for adjusting the phase to absorb an average difference in delay for transmission between the systems at a stage prior to the packet selecting means.

Also, the third feature of this invention is that the phase adjusting amount by the phase adjusting means is set by the initial sequence accompanied by a receiving start action of sequence of packets.

Also, the fourth feature of this invention is that the packet selecting means includes a function that monitors changes of the arrival phase of packets in the respective systems and controls passing of packets according to the result of monitoring, and where the arrival phase of packets in a specified system is made quicker than a predetermined allowance value, the packet selecting means interrupts passing of the packets, which subsequently reach from the corresponding system, to the output side, simultaneously sends a phase adjusting request to the phase adjusting means to instruct resetting of the phase with respect to the corresponding system, and cancels interruption of the passing of the packets of the corresponding system to the output side after a phase adjustment completion notice is received from the phase adjusting means, and the phase adjusting means sends the phase adjustment completion notice to the packet selecting means after resetting, when the phase adjustment request is received from the packet selecting means, the phase with respect to a system in which passing of packets to the output side is interrupted, so as to absorb a difference in delay for transmission between the systems.

Also, the fifth feature of this invention is that the packet selecting means monitors a change in the arrival phase of the packets in the respective systems based on continuity of sequence numbers of arriving packets.

According to the first aspect to the fifth aspect of the present invention, since the equipment is provided with packet selecting means and packet output record information storing means, and does not use a structure, by which a special packet is inserted to detect an error of systems, by using such a configuration that interrupts passing of a packet or permits the passing thereof depending on whether or not the packet has passed, non-stop switching can be brought about packet by packet by a simple configuration of packet switching at the receiving side without inserting any special packet to detect an error of the systems.

Therefore, when transmitting image data packet by packet with a redundant configuration, the transmission side apparatus does not require any function enhancement by which special packets are inserted, wherein the configuration of the existing packet output portion can be used as it is, and image data may be only distributed to a plurality of systems at a point of the network interface. Therefore, the above-described problems (1) and (2) of the prior arts can be solved.

Also, since the structure to insert special packets is not used, and further the systems are selected packet by packet, no processing delay occurs depending on the insertion cycle of packets for quality measurement and the quality measurement time at the receiving side. Therefore, the above-described problem (3) of the prior arts can be solved.

Furthermore, according to the fourth aspect and the fifth aspect, since a change in the arrival phase of packets in respective systems is monitored, and absorption of a difference in transmission delay is reestablished where the arrival phase of a packet in a specified system is made faster than the predetermined allowance value, it is possible to prevent the system at the receiving side from becoming unstable and prevent the images from stopping by removing the influence on the final output.

DETAILED DESCRIPTION OF THE PREFERRED EMBODIMENTS

The present invention is applicable to a transmission system of a redundant configuration in which the same image data is transmitted in a plurality of systems, in an asynchronization packet communications network represented by the IP network.

In the IP network, the UDP/IP protocol is generally used where real-time image transmission is carried out. Where image data, sound data and multiple-medium data including text data, etc., are handled, there are many cases where RTP is utilized as a payload format of the UDP packet. In the RTP packet, a sequential number (sequence number) is given to the header portion thereof, which can be utilized to detect a packet loss at the receiving side.

Hereinafter, the packet that forms the payload format of the UDP/IP, such as the RTP, may be simply called a "payload packet." The payload packet is not limited to the RTP format, but may be such that at least a sequence number which is able to identify the sequence along which respective packets are generated is given in compliance with a specified regulation.

Figure 1:
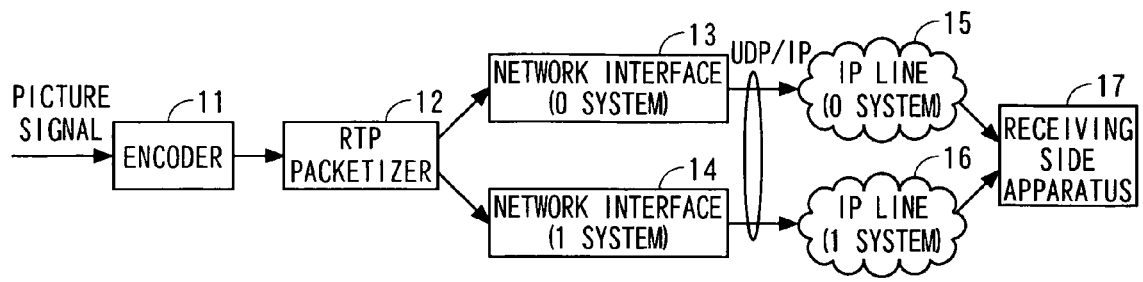
FIG. 1 is a block diagram showing a transmission system of dualized redundant configuration.

FIG. 1 is a block diagram showing a transmission system of a redundant configuration dualized in the 0 system and the 1 system. A transmission side apparatus includes an encoder 11 for encoding image signals, an RTP packetizer 12, and network interfaces 13 (0 system) and 14 (1 system). When being observed from the payload packet, dualization is carried out in a further lower-ranked protocol hierarchy (at the network side). That is, a payload packet sequence is distributed to two systems at the stage of executing UDP/IP output from the RTP packetizer 12. Accordingly, the distributed payload packet sequence are sent out to IP lines 15 (0 system) and 16 (1 system) via the network interfaces 13 (0 system) and 14 (1 system), respectively, and transmitted to a receiving side apparatus 17. Since the lines 15 and 16 of the respective systems are individually secured, it cannot be said that the timings at which specified payload packets reach the receiving side are coincident with each other between the systems.

Under a situation that the timings at which the payload packets reach the receiving side are not necessarily coincident with each other between the systems, the present invention enables that packets are sent out to the output side at a packet level by non-stop switching while selecting a packet of an authentic system from the receiving packets.

Hereinafter, a description of the present invention is given with reference to the drawings. The present invention is such that, when transmitting real-time typed data represented by compressed images or non-compressed images packet by packet by a redundant configuration, selection of an authentic system and a system switching are carried out at the same point with the data only in the receiving side.

Figure 2:
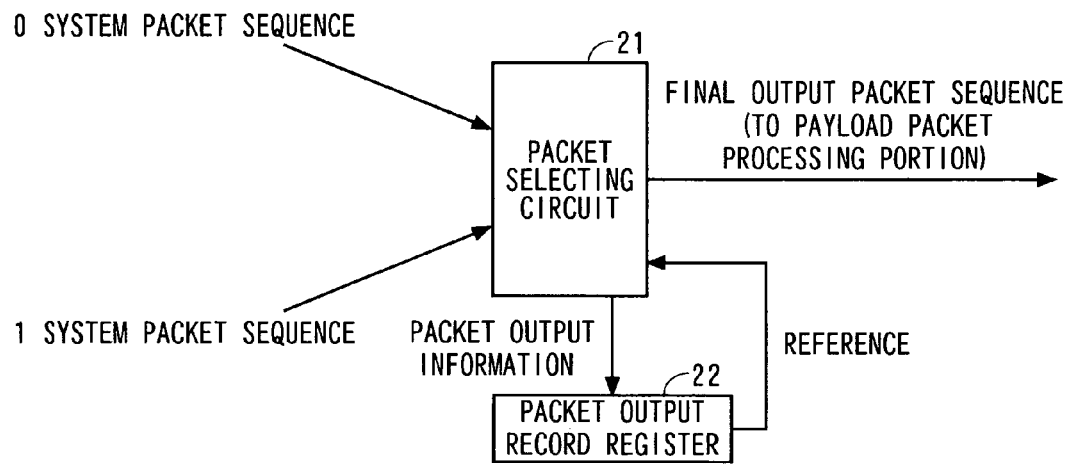
FIG. 2 is a functional block diagram showing Embodiment 1 of non-stop switching equipment for packet-based communication links according to the present invention.

FIG. 2 is a functional block diagram showing Embodiment 1 of non-stop switching equipment for packet-based communication links according to the present invention. Embodiment 1 is based on the assumption that the delay amounts in transmission between systems are not coincident with each other but are almost matched to each other. The assumption can be established by setting paths when constructing a redundant configuration.

As shown in FIG. 2, the non-stop switching equipment according to Embodiment 1 is provided with a packet selecting circuit 21 and a packet output record register 22.

Payload packets received from the 0 system and the 1 system are inputted into the packet selecting circuit 21. The packet selecting circuit 21 determines whether or not inputted payload packets passed. If the packet selecting circuit 21 determines that the packets did not pass, it allows the corresponding payload packets to pass to the output side, and if it is determined that the packets passed, the packet selecting circuit 21 does not allow the same to pass to the output side and discards the same.

Determination on whether or not the inputted payload packets passed may be carried out by whether or not the sequence numbers of the inputted payload packets have been registered in the packet output record register 22 with reference to the packet output record information registered in the packet output record register 22.

Also, the packet selecting circuit 21 sends the sequence numbers (packet output information) of the corresponding payload packets to the packet record register 22 according to pass payload packets to the output side.

The packet output record register 22 registers the sequence numbers of the payload packets passed through the packet selecting circuit 21. The sequence numbers of the payload packets passed through the packet selecting circuit 21 are registered in the packet output record register 22 as the packet output record information. In addition, in the packet output record register 22, the sequence numbers of the payload packets for which a specified duration of time elapsed since the registration are deleted or the sequence numbers of newly passed payload packets are rewritten (overwritten) on the sequence numbers of the payload packets for which a specified duration of time elapsed since registration, wherein a recording area to register new packet output information is secured.

The payload packets passed through the packet selecting circuit 21 are sent out to the payload packet processing portion as the final output packet sequence. In the payload packet processing portion, a prior art processing logic not incorporating the non-stop switching function is utilized as it is, and the payload packets may be processed.

Figure 3:
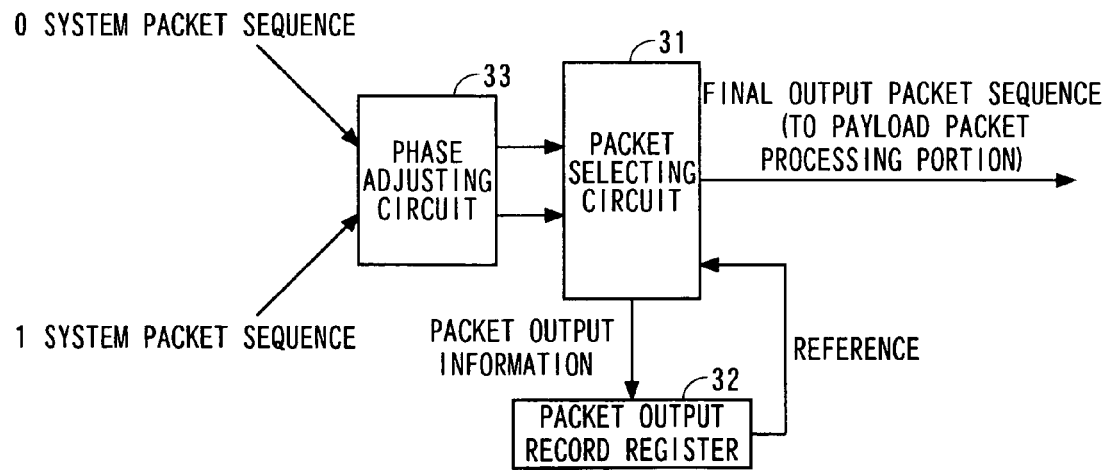
FIG. 3 is a functional block diagram showing Embodiment 2 of non-stop switching equipment for packet-based communication links according to the present invention.

FIG. 3 is a functional block diagram showing Embodiment 2 of non-stop switching equipment for packet-based communication links according to the present invention. Embodiment 2 absorbs a difference in delay of transmission between the systems and carries out packet selecting. Therefore, Embodiment 2 does not utilize the assumption, in which the delay amounts of transmission between the systems are almost matched to each other, as in Embodiment 1.

As shown in FIG. 3, the non-stop switching equipment according to Embodiment 2 includes a phase adjusting circuit 33, a packet selecting circuit 31, and a packet output record register 32.

Payload packets from the lines of the 0 system and the 1 system are inputted into the phase adjusting circuit 33. The phase adjusting circuit 33 absorbs an average difference in delay of transmission between the systems and sends out the payload packets of the 0 system and the 1 system to the packet selecting circuit 31.

The packet selecting circuit 31 sends non-passed payload packets to the output side with reference to the packet output record information registered in the packet output record register 32 as in Embodiment 1, and sends out the sequence numbers of the corresponding payload packets to the packet output record register 32. The packet output record register 32 registers the sequence number of the payload packets passed through the packet selecting circuit 31 as the packet output record information.

Figure 4:
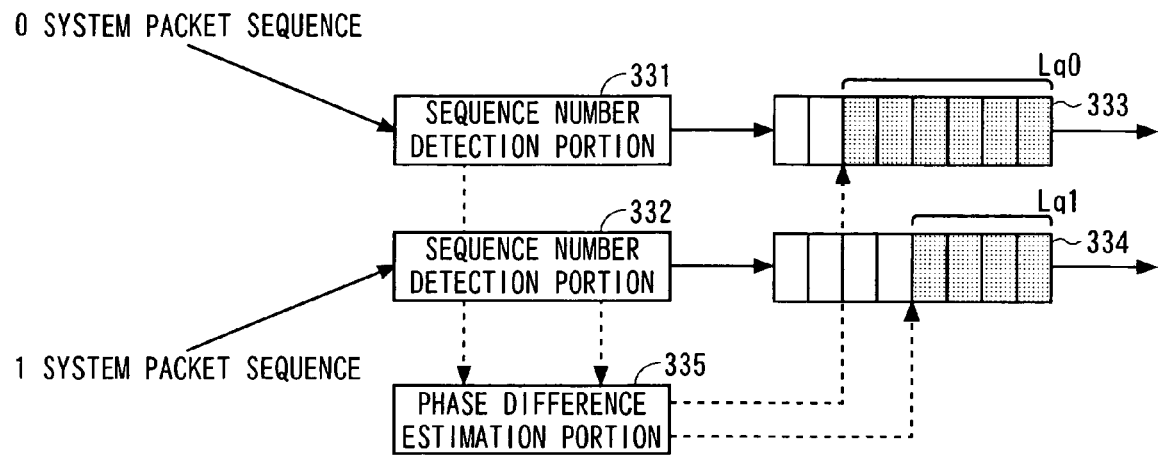
FIG. 4 is a block diagram showing one example of a detailed configuration of a phase adjusting circuit.

FIG. 4 is a block diagram showing one example of a detailed configuration of the phase adjusting circuit 33. The phase adjusting circuit 33 is provided with sequence number detection portions 331, 332, waiting matrix memories 333, 334, and phase difference estimation portion 335.

The sequence number detection portions 331 and 332 are provided with respect to the 0 system and the 1 system, respectively, and detect the sequence numbers of the respective payload packets included in the payload packet sequence received from the respective systems. The waiting matrix memories 333 and 334 hold the payload packet sequence inputted via the sequence number detection portions 331 and 332, respectively. The phase difference estimation portion 335 estimates a difference in delay of transmission existing between the systems based on the sequence numbers detected by the sequence number detection portions 331 and 332.

The corresponding difference in delay of transmission is absorbed by controlling the waiting matrix memories 333 and 334 according to the difference in delay of transmission, which is estimated by the phase difference estimation portion 335, and sends out the payload packets from the waiting matrix memories 333 and 334 at the timing at which the 0 system and the 1 system are brought into almost the same phase.

The difference in delay existing between the systems can be estimated from the sequence numbers of the payload packets received from the 0 system and 1 system. Absorption of the difference in delay existing between the systems may be carried out as an initial sequence accompanied by a receiving start action of the payload packet sequence. The difference in delay existing between the systems may be absorbed by setting the number of packets Lq0 and Lq1 that are held in the waiting matrix memories 333 and 334 of the respective systems.

Generally, since, even if the signal source is based on a fixed bit rate, there is jitter in the arrival interval of the payload packets resulting from the characteristics of the lines (network), it is impossible to strictly absorb the difference in delay for transmission in all the packets between the systems. Absorption of the difference in delay for transmission in the waiting matrix memories 333 and 334 means compensation of the average difference in delay for transmission, which internally exists between the systems. The difference in delay for transmission can be acquired by investigating the sequence numbers of payload packets received almost at the same time for a fixed duration of time or investigating the difference in time at which the payload packets of the same sequence numbers are received, for a fixed duration of time.

Figure 5:
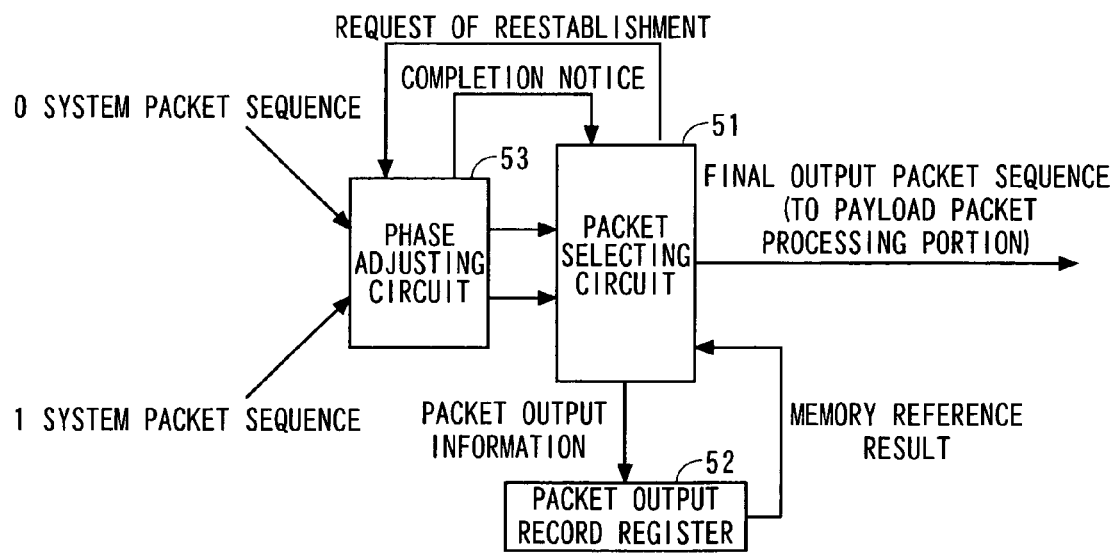
FIG. 5 is a functional block diagram showing Embodiment 3 of non-stop switching equipment for packet-based communication links according to the present invention.

FIG. 5 is a functional block diagram showing Embodiment 3 of non-stop switching equipment for packet-based communication links according to the present invention. If the arrival phase of packets greatly changes by a change of transmission path etc., in a real-time image transmission system such as, for example, distribution of live images etc., the system at the receiving side becomes unstable. As a result, there is a unique problem, that is stop of the image. Embodiment 3 can deal with such a problem.

As in Embodiment 2, Embodiment 3 includes a phase adjusting circuit 53, a packet selecting circuit 51 and a packet output record register 52. However, Embodiment 3 differs from Embodiment 2 in that the phase adjusting circuit 53 further has a function of reestablishing absorption of delay for transmission, and the packet selecting circuit 51 has a function of checking the continuity of sequence numbers with respect to the payload packets received from the phase adjusting circuit 53 for each of the systems.

The phase adjusting circuit 53, the packet selecting circuit 51 and the packet output record register 52 operate as in Embodiment 2. Where the transmission path is changed over in a direction, along which the delay in transmission is greatly shortened, due to the occurrence of a fault in mid-flow of a specified system, the sequence numbers of the payload packets received from the corresponding system greatly change. Thus, where the transmission path is changed over in a direction along which the delay in transmission is greatly shortened, and where the sequence numbers of the payload packets received from the corresponding system are greatly changed, the packet selecting circuit 51 judges the same, interrupts the passing of the payload packets received from the corresponding system, and at the same time, sends a request of reestablishment to the phase adjusting circuit 53.

The changing of transmission path in the direction along which the delay in transmission is greatly shortened in a specified system may be judged by (nC-nP) exceeding a predetermined positive threshold where it is assumed that the sequence number of the payload packet received from the corresponding system and the sequence number of the payload packet received immediately before that are nC and nP, respectively.

When the phase adjusting circuit 53 receives a request of reestablishment from the packet selecting circuit 51, the phase adjusting circuit 53 temporarily stops the sending of the payload packets of the system in which the sequence numbers are greatly changed, executes the processing similar to the initial sequence, and absorbs the difference in delay for transmission between the systems. The phase adjusting circuit 53 sends a completion notice to the packet selecting circuit 51 after absorption of the difference in delay for transmission is re-established. The packet selecting circuit 51 returns the system, in which sending of the payload packet is interrupted, to a normal state (interruption of sending of the payload packets is cancelled) upon receiving the completion notice from the phase adjusting circuit 53.

Where a series of processes in which absorption of the difference in delay for transmission is reestablished is carried out, continuity of a sending process of the payload packets in the system other than the corresponding system is maintained.

The above-described embodiments have a configuration in which a system as currently used is selected packet by packet with priority placed on reliability and simplicity of mounting. Therefore, differing from a prior art general system of a redundant configuration, the embodiments are not controlled for recognition of the currently used system, wherein a change event of the systems does not completely correspond to occurrence of a fault in the currently used system. On the other hand, a case is conceived where clear distinction of a currently used system and a reserve system is requested with operational efficiency taken into consideration. If in the above-described embodiments the packet selecting circuit allows the payload packets of the currently used system to pass with priority, and allows the payload packets of the reserve system to pass based on detection of a fault in the respective systems on the basis of a change instruction from the periphery or monitoring of the arrival state of the payload packets, the embodiments can satisfy such a request.

What is claimed is:

1. A non-stop switching equipment for packet-based communication links in a transmission system for transmitting image data packet by packet using a plurality of systems of a redundant configuration, comprising:
   means for selecting packets, which selects packets from the plurality of systems and allows selected packets to pass to an output side of said non-stop switching equipment;
   means for holding output record information of packets, which holds the record information of packets passed by the packet selecting means; and
   means for adjusting a phase to absorb an average difference in delay for transmission between the systems at a stage prior to the selecting by the packet selecting means,
   wherein the packet output record information holding means holds the sequence numbers of the packets as the record information whenever the packet selecting means selects packets and allows the selected packets to pass to the output side, and
   the packet selecting means determines, when a packet arrives from the respective systems, whether or not the packet has already been passed to the output side, based on the sequence numbers in the packet output record information, interrupts passing of the packet to the output side if already been passed to the output side, and allows the packet to pass to the output side if not already passed.

2. The non-stop switching equipment for packet-based communication links according to claim 1, wherein the phase adjusting amount by the phase adjusting means is set by the initial sequence accompanied by a receiving start action of packet sequence.

3. The non-stop switching equipment for packet-based communication links according to claim 2, wherein the packet selecting means includes a function that monitors changes of the arrival phase of packets in the respective systems and controls passing of packets according to the result of monitoring, and where the arrival phase of packets in a specified system is made quicker than a predetermined allowance value, the packet selecting means interrupts passing of the packets, which subsequently reach from the corresponding system, to the output side, simultaneously sends a phase adjusting request to the phase adjusting means to instruct resetting of the phase with respect to the corresponding system, and cancels interruption of the passing of the packets of the corresponding system to the output side after a phase adjustment completion notice is received from the phase adjusting means, and the phase adjusting means sends the phase adjustment completion notice to the packet selecting means after resetting, when the phase adjustment request is received from the packet selecting means, the phase with respect to a system in which passing of packets to the output side is interrupted, so as to absorb a difference in delay for transmission between the systems.

4. The non-stop switching equipment for packet-based communication links according to claim 3, wherein the packet selecting means monitors a change in the arrival phase of the packets in the respective systems based on continuity of sequence numbers of arriving packets.

5. The non-stop switching equipment for packet-based communication links according to claim 1, wherein the packet selecting means includes a function that monitors changes of the arrival phase of packets in the respective systems and controls passing of packets according to the result of monitoring, and where the arrival phase of packets in a specified system is made quicker than a predetermined allowance value, the packet selecting means interrupts passing of the packets, which subsequently reach from the corresponding system, to the output side, simultaneously sends a phase adjusting request to the phase adjusting means to instruct resetting of the phase with respect to the corresponding system, and cancels interruption of the passing of the packets of the corresponding system to the output side after a phase adjustment completion notice is received from the phase adjusting means, and the phase adjusting means sends the phase adjustment completion notice to the packet selecting means after resetting, when the phase adjustment request is received from the packet selecting means, the phase with respect to a system in which passing of packets to the output side is interrupted, so as to absorb a difference in delay for transmission between the systems.

6. The non-stop switching equipment for packet-based communication links according to claim 5, wherein the packet selecting means monitors a change in the arrival phase of the packets in the respective systems based on continuity of sequence numbers of arriving packets.

7. A method for transmitting image data packet by packet using a plurality of systems of a redundant configuration in packet-based communication links in a transmission system, said method comprising:

selecting packets from the plurality of systems and allowing selected packets to pass to an output side of a non-stop switching equipment for the packet-based communication links;

holding sequence numbers of the selected packets passed to the output side as packet output record information; and adjusting a phase to absorb an average difference in delay for transmission between the systems, wherein said selecting determines, when a packet arrives from the respective systems, whether or not the packet has already been passed to the output side, based on the sequence numbers in the packet output record information, interrupts passing of the packet to the output side if already been passed to the output side, and allows the packet to pass to the output side if not already passed.

8. A method for transmitting image data packet by packet using a plurality of systems of a redundant configuration in packet-based communication links in a transmission system, said method comprising:

selecting packets from the plurality of systems and allowing selected packets to pass to an output side of a non-stop switching equipment for the packet-based communication links;

holding sequence numbers of the selected packets passed to the output side as packet output record information; and adjusting a phase to absorb an average difference in delay for transmission between the systems, wherein said selecting determines, when a packet arrives from the respective systems, whether or not the packet has already been passed to the output side, based on the sequence numbers in the packet output record information, interrupts passing of the packet to the output side if already been passed to the output side, and allows the packet to pass to the output side if not already passed, and wherein said adjusting acquires the average difference in delay for transmission between the systems prior to said selecting by investigating the sequence numbers of packets received almost at a same time for a fixed duration of time or by investigating a difference in time at which packets with same sequence numbers are received for a fixed duration of time.

* * * * *